E. HAYES.
VEHICLE WHEEL.
APPLICATION FILED JUNE 13, 1916.

1,289,754.

Patented Dec. 31, 1918.
2 SHEETS—SHEET 1.

WITNESSES:
F. A. Carlson

INVENTOR.
Edward Hayes,
BY
ATTORNEY

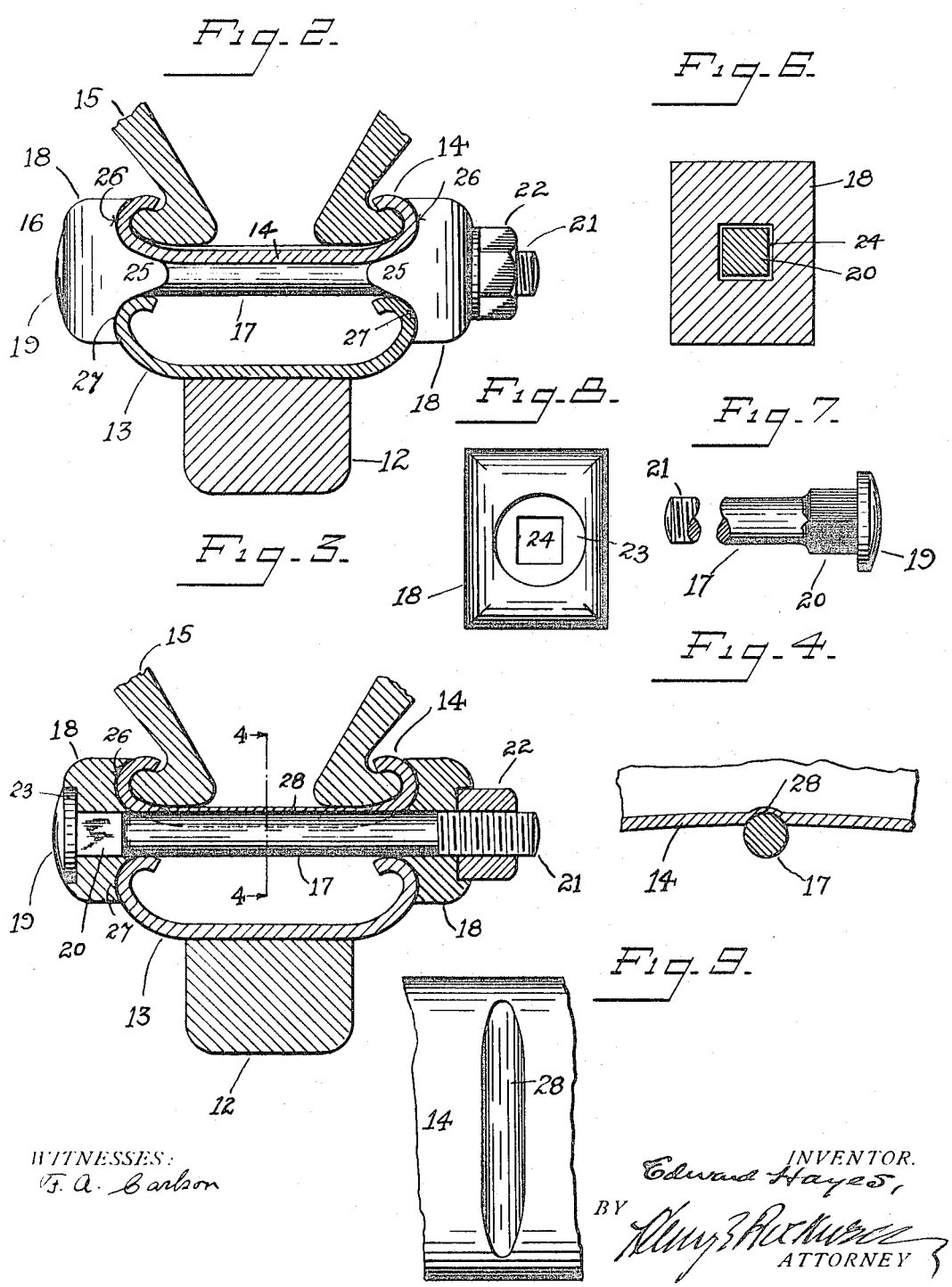

UNITED STATES PATENT OFFICE.

EDWARD HAYES, OF BROOKLYN, NEW YORK, ASSIGNOR OF TWO-THIRDS TO HAYES-DIEFENDERFER CO., INC., OF NEW YORK, N. Y., A CORPORATION OF NEW YORK, AND ONE-THIRD TO GEORGE B. PICKOP, OF NEW HAVEN, CONNECTICUT.

VEHICLE-WHEEL.

1,289,754.   Specification of Letters Patent.   Patented Dec. 31, 1918.

Application filed June 13, 1916.  Serial No. 103,474.

*To all whom it may concern:*

Be it known that I, EDWARD HAYES, a citizen of the United States, residing in Brooklyn, county of Kings, State of New York, have invented certain new and useful Improvements in Vehicle-Wheels, of which the following is a full, clear, and exact description.

This invention relates to vehicle wheels, and more particularly to automobile wheels with pneumatic tires. The invention refers especially to demountable tire rims, and means for clamping said rims on wheels with fixed clencher rims.

The advantages of demountable rims are so well recognized as to need no special comment. When an automobile has pneumatic or other tires directly carried by clencher rims permanently fixed on the wheels, the disadvantages incident to making repairs on the road often cause the automobilist to equip his car with demountable rims. In so doing, however, it is generally necessary to purchase entirely new wheels as well as the separate demountable rims; and even if the wheels can be modified to take the demountable rims, considerable trouble and expense are incurred in making the necessary alterations.

The primary object of my invention is to overcome these drawbacks and to furnish simple, convenient and efficient means for applying a demountable tire rim to an ordinary wheel with clencher flanges. By using my invention, an ordinary clencher rim wheel may be quickly and conveniently converted into a demountable rim wheel at very slight expense. In achieving this result, it is unnecessary to alter or modify the clencher rim wheel to any extent whatever, because the demountable rim can be readily slipped over the clencher rim on the wheel and clamped thereto by simple clamping devices which are physically separate from both rims, and can be readily slipped in between the rims for fastening the parts securely together.

Another object of the invention is to provide means for detachably clamping together concentric tire rims in order to permit the use of a tire which is appreciably larger than the size adapted to the inner of the two rims, so as to thereby enlarge the effective diameter of the wheel and increase the mileage. I also have in view the general improvement of demountable rim constructions.

To these and other ends, the invention consists in the novel features and combinations of parts to be hereinafter described and claimed.

In the accompanying drawings,

Figure 1 is a side elevation of a wheel embodying my improvements;

Figs. 2 and 3 are enlarged detail sections on lines 2—2 and 3—3 respectively of Fig. 1;

Fig. 4 is a detail section on line 4—4 of Fig. 3;

Fig. 6 is a section on line 6—6 of Fig. 5;

Fig. 7 is a detail of the head of the clamping bolt;

Fig. 8 is a detail face view of one of the clamping or spacing blocks; and

Fig. 9 is a detail of the outer tire rim.

Figure 1:
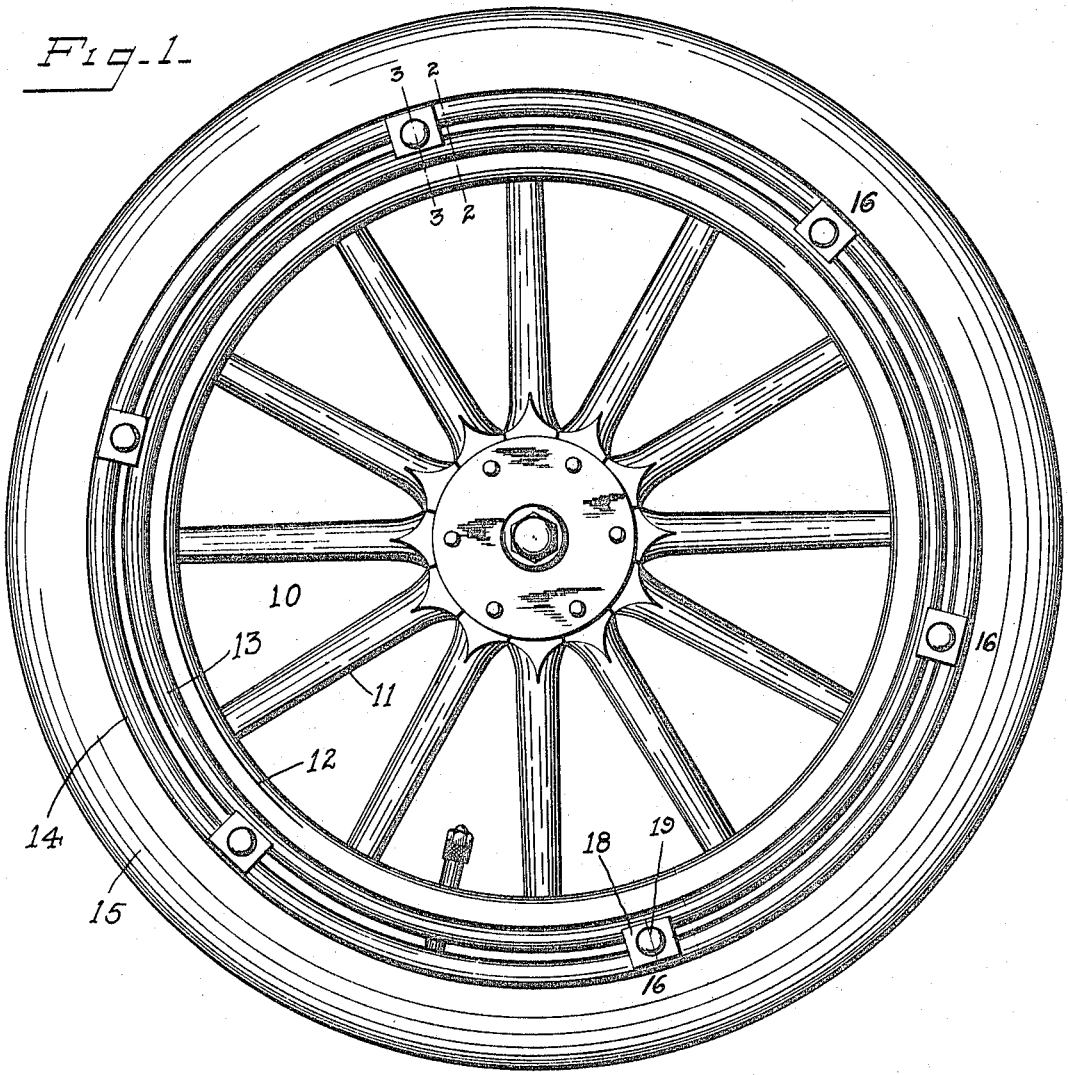

In the drawings, I have shown my improvements applied to a wheel 10 having wooden spokes 11, a wooden felly 12, and a metal clencher rim 13, but the particular materials of which these parts are constructed are unimportant. The invention can be carried into effect with wire wheels, spring wheels and other types. Supposing, however, for the sake of illustration, that the wheel 10 is an ordinary Ford wheel of which the clencher rim 13 is designed to carry a 30x3 or a 30x3½ tire, and it is desired to convert it into a wheel of the demountable rim type, I take a plain clencher rim 14 designed to carry a tire 15 of, say 32x3½ inches, and place this rim with the tire thereon over the rim 13, as shown in Fig. 1. The two rims are then detachably clamped together in concentric relation by suitable clamping devices 16, of which six are shown in Fig. 1, although the number of these clamping devices may be varied as called for by different conditions. The difference in the diameters of the rims 13, 14 is such as to provide a clearance space throughout the periphery of the wheel, and the clamping devices 16 are so constructed and arranged that they pass through this clearance space without passing through the felly 12 or the fixed rim 13, as more particularly described hereinafter.

Figure 5:
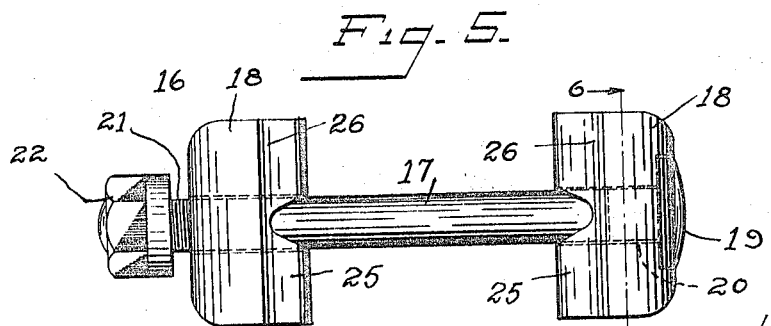
Fig. 5 is a detail plan view of one of the clamping devices.

Referring particularly to Fig. 5, it will be observed that in the form illustrated, the clamping device comprises a bolt 17 on which are mounted two spaced clamping elements 18. In the particular form shown, the bolt 17 is provided with a head 19 and with a polygonal portion 20 adjacent the head, while the opposite end of the bolt is threaded at 21 to receive a clamping nut 22. In the example shown, both of the clamping elements 18 are identical, and a detail description of one will suffice. The element 18 is preferably in the nature of a clamping or spacing block which may be conveniently made of cast metal, and has a through perforation for the bolt 17. On its outer face it is somewhat rounded off and provided with a recess or countersink 23. The left hand clamping block 18, shown in Fig. 2, receives the bolt head 19 in its recess or countersink 23, whereas the countersink 23 of the right hand clamping block receives the base portion of the clamping nut 22. The polygonal portion 20 near the bolt head fits a corresponding polygonal recess 24 communicating with the countersink or recess 23, and thus that clamping block which is adjacent the bolt head is non-rotatively interlocked with the bolt so as to be incapable of turning thereon. Furthermore, in the particular form shown, the clamping block adjacent the bolt head is soldered on the bolt so as to be incapable of sliding lengthwise thereon, but this is not a material feature.

Each of the clamping blocks 18 is provided on its inner face with a spacing rib or shoulder 25, which enters between the rims 13, 14 and spaces them apart at the required distance. Referring to Figs. 2 and 3, it will be observed that above the rib or shoulder 25 the block is provided on its inner face with a seat 26 for the edge portion of the rim 14, while beneath the shoulder or rib a seat 27 is provided for the clencher flange of the rim 13. The seat 26 is preferably curved to conform closely to the corresponding flange of the rim 14 over a considerable portion of the arc on which said flange is bent up from the rim body. The block is intended to clamp the flange at the side, and also to support the flange and rim body from beneath. On the other hand, the seat 27 beneath the rib or shoulder 25 is so formed as to conform closely to the upper surface of the corresponding clencher flange of the rim 13 and to the side of said flange. In the particular form shown, the seats 26 and 27 are in the nature of parallel grooves or channels in which the respective clencher flanges of the two rims are adapted to be locked so as to space the rims apart at the required distance when the blocks 18 of a clamping device are moved into tight engagement with the rims by screwing up the clamping nut 22.

As has been previously stated, the bolt 17 of each clamping device is passed through the clearance space between the two rims, and no modification of the regular wheel structure is necessary. Suitable means should be provided, however, for determining the proper location of the clamping devices in applying the demountable rim to the wheel, and in order to achieve this end I provide the outer rim 14 with transverse seats or grooves 28, which receive and seat the bolts 17 of the clamping devices. The grooves 28 extend transversely across the demountable rim 14 on its inner face and conform to the outer portions of the bolts throughout a considerable portion of the length of the bolts. These grooves show where the bolts should be located, and they permit the outer rim to be brought quite close to the inner rim. Moreover, they prevent the clamping devices from shifting relatively to the outer rim. In the form shown, there are six equidistantly spaced grooves in the outer rim, and the hole which is provided in said rim for the passage of the tire valve 29 is preferably located half way between two adjacent grooves.

In putting on the demountable rim 14 and its tire, the rim and tire are slipped over the wheel in such a manner that the tire valve passes through the usual opening provided for it in the felly 12. Next, a bolt 17 with a spacing block 18 on the head portion thereof is slipped into one of the grooves 28 next to the tire valve, and passed through the space between the rims. A clamping block 18 is then placed on the bolt at the other side of the wheel, and a nut 22 is then screwed up on the bolt so as to move the two spacing blocks 18 toward each other and into engagement with the rims. Each spacing block is provided with means for positively spacing the two rims from each other and for engaging said rims frictionally. However, when the first bolt is placed in position, the nut is not tightened up until the other clamping devices have been placed in position. After placing one clamping device on one side of the tire valve, another clamping device is placed on the other side of the tire valve, and then the remaining clamping devices are placed in position with their bolts engaging the corresponding grooves of the outer rim. Finally, the nuts of all of the clamping devices are tightened up in a substantially uniform manner. The two rims will then be held concentrically with each other with a uniform clearance space between them all around, but the clamping devices will hold the parts in the assembled position in a very efficient and reliable manner. Owing to the strong lateral pressure exerted by the bolts and the tight frictional engagement of the several clamping or spacing blocks with their respective rims, the creeping of one rim relatively to the other is prevented and a strong, durable construction is provided.

It will be readily understood from the foregoing that the outer rim and its tire may be very readily detached from the wheel. To do this, it is merely necessary to remove the clamping bolts, whereupon the outer rim and its tire may be readily slipped off the wheel in a lateral direction for the substitution of another rim with an inflated tire.

It will be seen that by my invention a very simple, convenient demountable rim construction is provided. A tire of comparatively large size may be used on a small wheel, and thereby increased mileage is obtained. Moreover, my invention can be carried into effect with wire wheels because the clamping devices can coöperate directly with the clencher rim of such wire wheels, and there is no necessity of providing a special form of felly, as in the case of ordinary demountable rims.

It will be observed that the improved clamping and spacing device herein described can be very readily and cheaply made inasmuch as the blocks are of simple form and likewise the bolt. The polygonal portion located at or adjacent the head of the round bolt shank can be readily formed in the process of manufacture, and as the head 19 of the bolt occupies a countersink in the adjacent spacing block, there is no unsightly or inconvenient projection from the side face of the said block. Preferably, the nutted ends of the bolts will be disposed at the inner faces of the wheels of the automobile so that the headed ends of the bolts will be disposed at the outside.

Various changes in the details of the construction may be made without departing from the scope of my invention as defined in the claim.

What I claim is:—

The combination with a wheel having a clencher rim, of a tire rim of greater diameter than said first rim superposed thereon but with a clearance space between said rims, the inner surface of said second rim being provided with a plurality of transverse, partly cylindrical grooves, a series of spacers between said rims at one side of the wheel, another series of spacers between said rims at the opposite side of the wheel, said spacers arranged in pairs and in alinement with said grooves, and a connecting bolt for each pair of spacers having a head on one end and a nut on the opposite end, said bolt having a round shank engaging the corresponding partly cylindrical groove.

In witness whereof, I have hereunto set my hand on the 12th day of June, 1916.

EDWARD HAYES.